United States Patent [19]
Benford et al.

[11] Patent Number: 5,251,734
[45] Date of Patent: Oct. 12, 1993

[54] HYDRAULIC CONTROLS FOR LOCK-UP CLUTCH OF A TORQUE CONVERTER ASSEMBLY

[75] Inventors: Howard L. Benford, Bloomfield Hills; Roy S. Nassar, Canton, both of Mich.

[73] Assignee: Chrysler Corporation, Highland Park, Mich.

[21] Appl. No.: 883,631

[22] Filed: May 8, 1992

[51] Int. Cl.$^5$ .................. F16H 45/02; F16H 61/14
[52] U.S. Cl. ......................... 192/3.3; 192/3.28
[58] Field of Search ............... 192/3.3, 3.29, 3.28; 74/890, 732

[56] References Cited

U.S. PATENT DOCUMENTS

| | | | |
|---|---|---|---|
| 2,726,557 | 12/1955 | Ackerman | 74/732 |
| 3,025,723 | 3/1962 | Miller | 74/890 |
| 3,073,183 | 1/1963 | Kelley | 74/732 |
| 4,051,932 | 10/1977 | Arai et al. | 192/3.3 |
| 4,090,417 | 5/1978 | Burcz et al. | 74/864 |
| 4,289,048 | 9/1981 | Mikel et al. | 74/733 |
| 4,588,059 | 5/1986 | Miki et al. | 192/3.28 |
| 4,768,632 | 9/1988 | Moan | 192/3.3 |
| 4,880,090 | 11/1989 | Ando | 192/3.3 |
| 4,989,702 | 2/1991 | Yoshimura et al. | 192/3.29 |
| 4,998,604 | 3/1991 | Vokovich et al. | 74/890 X |
| 5,010,990 | 4/1991 | Yoshimura et al. | 192/3.3 |
| 5,086,894 | 2/1992 | Iizuka et al. | 192/3.29 |
| 5,090,527 | 2/1992 | Imamura et al. | 192/3.29 |
| 5,113,984 | 5/1992 | Benford | 192/3.3 |
| 5,145,045 | 9/1992 | Wakahara | 192/3.29 |
| 5,152,386 | 10/1992 | Imamura | 192/3.3 X |
| 5,163,540 | 11/1992 | Mainquist et al. | 192/3.29 X |

FOREIGN PATENT DOCUMENTS 0043545 1/1982 European Pat. Off. .

*Primary Examiner*—Leslie A. Braun
*Assistant Examiner*—Andrea Pitts
*Attorney, Agent, or Firm*—Edward P. Barthel

[57] ABSTRACT

A valve assembly in a fluid system of an automatic transmission for controlling the lock-up of the torque converter assembly of the automatic transmission includes a regulator valve for establishing a pressure level of fluid flow from a fluid source, a torque converter control valve for controlling fluid pressure to the torque converter assembly during the disengagement operating mode, and a lock-up valve receiving fluid pressure feedback from the torque converter control valve to close a fluid path during the disengagement operating mode and opening the fluid path for allowing fluid pressure to the apply side of the torque converter assembly during the engagement operating mode.

13 Claims, 4 Drawing Sheets

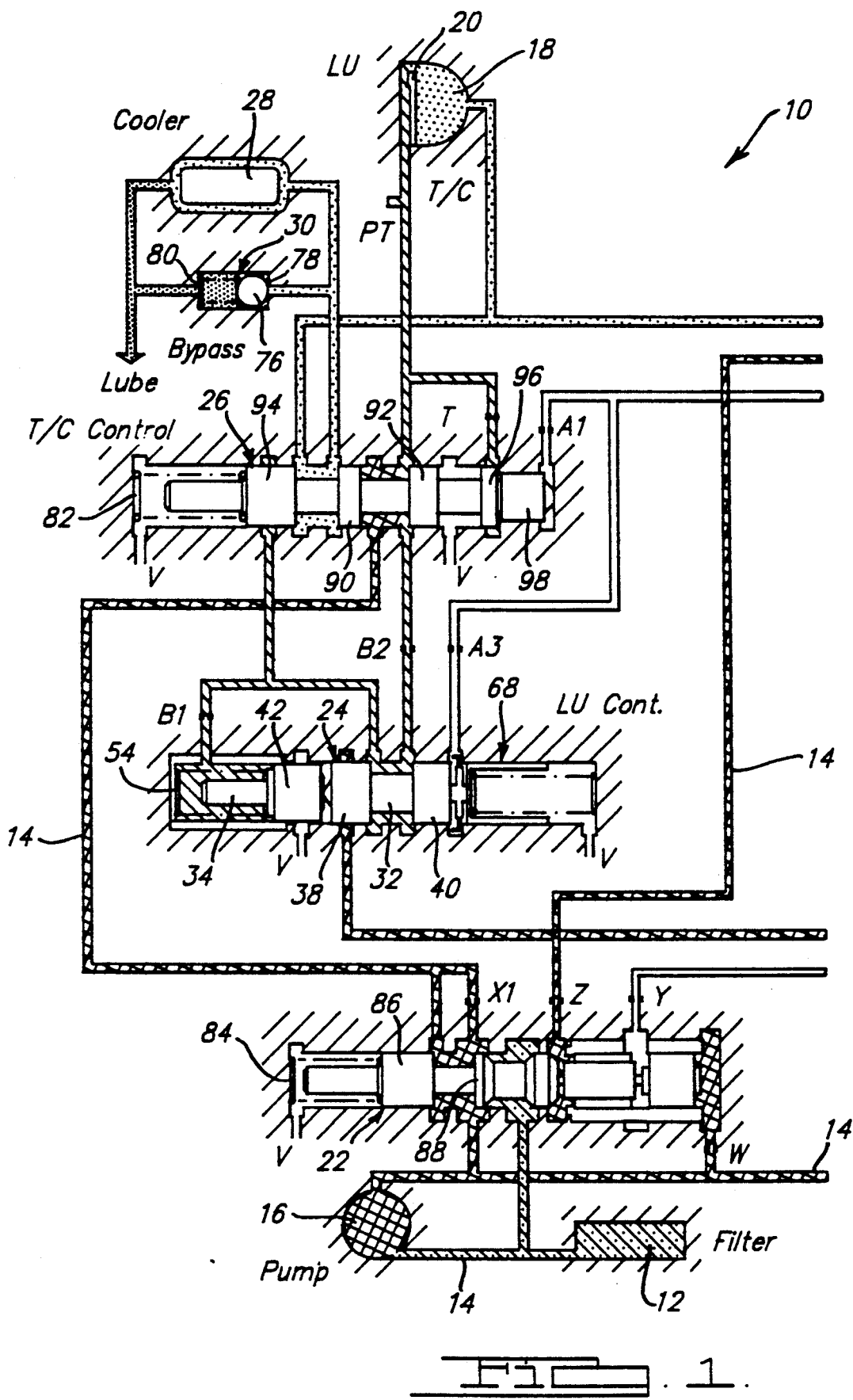

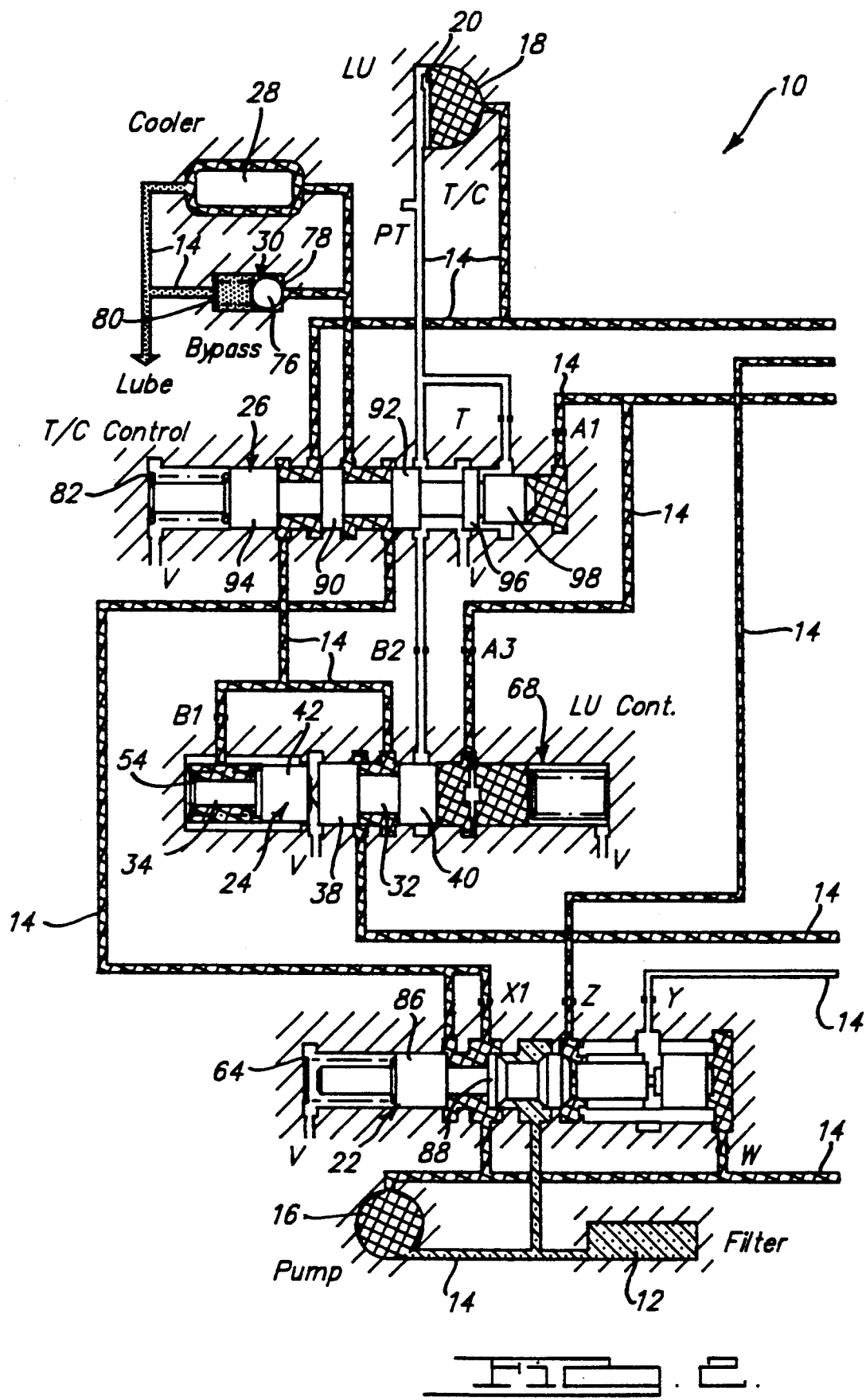

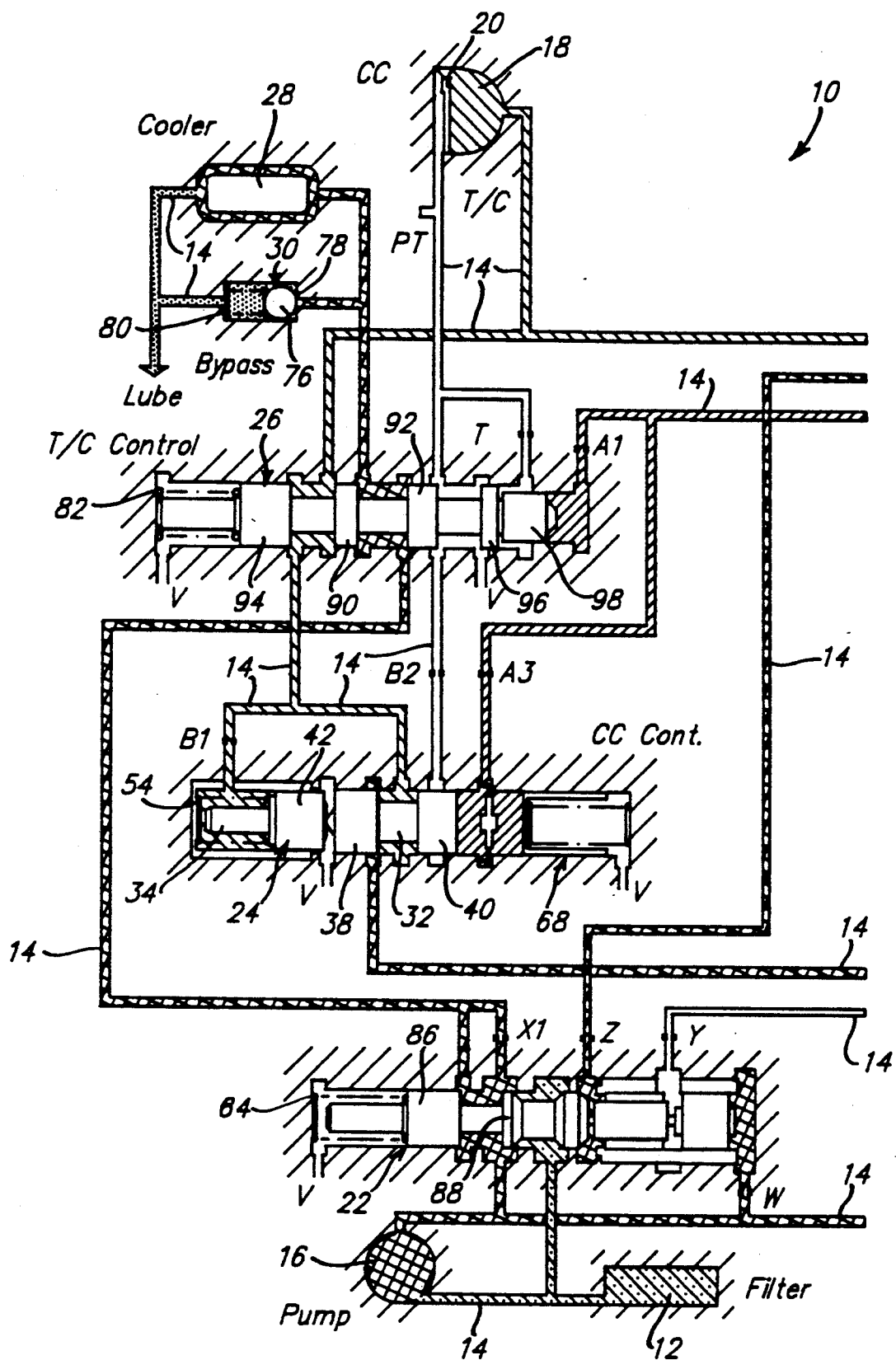

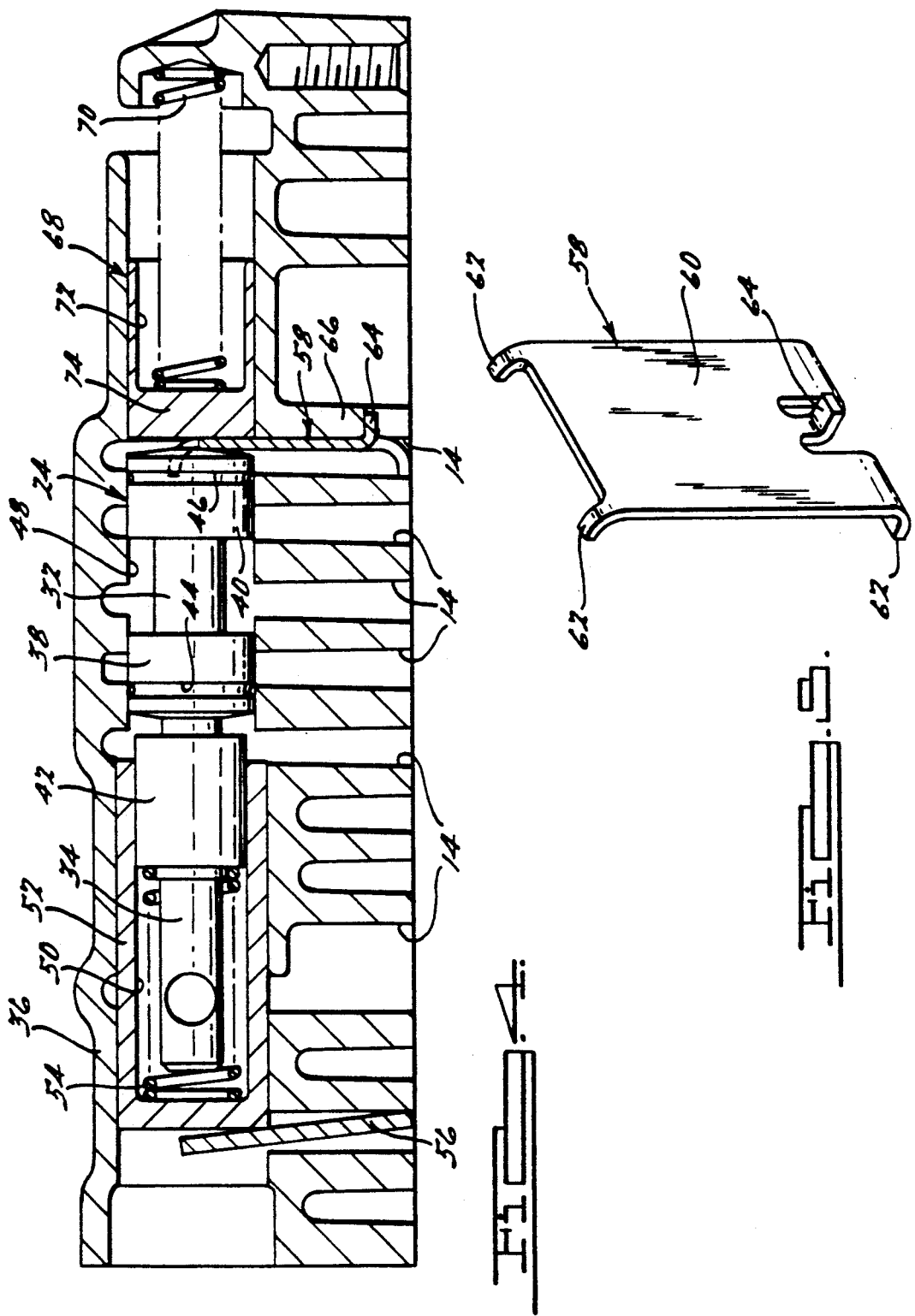

HYDRAULIC CONTROLS FOR LOCK-UP CLUTCH OF A TORQUE CONVERTER ASSEMBLY

BACKGROUND OF THE INVENTION

1. Field of the Invention

The present invention relates generally to an automatic transmission primarily intended for motor vehicle use, and more particularly, to a hydraulic circuit for controlling the lock-up clutch of a torque converter assembly in an automatic transmission.

2. Description of the Related Art

Automatic transmissions are designed to take automatic control of the frictional units, gear ratio selection and gear shifting. In general, the major components featured in such an automatic transmission are: a torque converter assembly; fluid pressure-operated multi-plate drive or brake clutches and/or brake bands which are connected to the individual elements of the planetary gearsets in order to perform gear shifts without interrupting the tractive power; one-way clutches in conjunction with the frictional units for optimization of power shifts; and transmission controls such as valves for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuation of the respective frictional units for effecting gear changes in the transmission. The valves used in the hydraulic circuit generally include spring-biased spool valves, spring-biased accumulators and ball check valves. Since many of these valves rely upon springs to provide a predetermined amount of force, it will be appreciated that each transmission design represents a finely tuned arrangement of interdependent valve components.

Typically, the hydraulic circuit includes a valve assembly to control the fluid pressure to the torque converter assembly. An example of such a valve assembly is disclosed in Leising et al. U.S. Pat. No. 4,875,391 which is assigned to the same assignee as the present application. While the patented valve assembly has worked well, one disadvantage is that the valve assembly uses two-sided control for the lock-up clutch of the torque converter assembly. Another disadvantage is that the patented valve assembly does not have fluid pressure feedback on the lock-up control valve. A further disadvantage is that the patented valve assembly lacks a structure to dampen or cushion the application of the lock-up control valve.

SUMMARY OF THE INVENTION

It is, therefore, one object of the present invention to provide a hydraulic circuit for controlling the lock-up clutch of a torque converter assembly in an automatic transmission.

It is another object of the present invention to provide single-sided control for the lock-up clutch of the torque converter assembly.

It is yet another object of the present invention to provide a valve assembly in which a lock-up control valve includes fluid pressure feedback thereon and is placed before the torque converter control valve.

It is a further object of the present invention to dampen or cushion the application of the lock-up control valve.

To achieve the foregoing objects, the present invention is a valve assembly in a fluid system of a vehicle transmission for directing fluid flow from a fluid source to the torque converter assembly. The valve assembly includes regulator valve means for establishing a pressure level of fluid flow from a fluid source in the valve assembly. The valve assembly also includes a torque converter control valve for controlling inlet and outlet fluid pressure to and from a torque converter assembly.

One advantage of the present invention is that a torque converter control valve controls the pressure from the pressure regulator to the torque converter assembly of the automatic transmission during an unlock or disengagement operating mode. Another advantage of the present invention is that the lock-up control valve controls the fluid pressure to the torque converter assembly and the torque converter control valve controls the fluid pressure from the torque converter assembly during frictional coupling or "lock-up" of the torque converter assembly to the engine of the vehicle. Yet another advantage of the present invention is that the valve assembly provides single-sided control for the lock-up clutch of the torque converter assembly. Still another advantage of the present invention is that fluid pressure feedback is placed on the lock-up control valve. A further advantage is that an accumulator is provided to dampen or cushion the application of the lock-up control valve.

Other objects, features and advantages of the present invention will be readily appreciated as the same becomes better understood after reading the following description taken in conjunction with the accompanying drawings.

BRIEF DESCRIPTION OF THE DRAWINGS

FIG. 1 is a partial schematic diagram of a hydraulic circuit according to the present invention illustrated in a first operational mode.

FIG. 2 is a view similar to FIG. 1 illustrated in a second operational mode.

FIG. 3 is a view similar to FIG. 2 illustrated in a third operational mode.

FIG. 4 is a sectional view illustrating a lock-up clutch control valve according to the present invention.

FIG. 5 is a perspective view of a component of the lock-up control valve of FIG. 4.

DESCRIPTION OF THE PREFERRED EMBODIMENT(S)

Generally, an automatic transmission (not shown) is adapted for use in a vehicle (not shown) such as an automobile. The present invention is used with an automatic transmission of the type disclosed in Leising et al. U.S. Pat. No. 4,875,391, the disclosure of which is hereby incorporated by reference.

Referring to FIGS. 1 through 3, a schematic diagram of a hydraulic circuit 10 according to the present invention is partially shown. The hydraulic circuit 10 is similar to that disclosed in U.S. Pat. No. 4,875,391, previously described, except to that specially illustrated and described herein. The hydraulic circuit 10 is used for controlling and operating the fluid flow throughout the automatic transmission. The hydraulic circuit 10 may be controlled by the algorithms disclosed in U.S. Pat. No. 4,875,391.

The hydraulic circuit 10 includes a fluid source (not shown) and a filter 12 attached to a transfer plate (not shown) at the inlet thereof to prevent dirt and other foreign matter from entering the hydraulic circuit 10. The hydraulic circuit 10 also includes a plurality of internal passageways 14, a pump assembly 16 and a torque converter assembly 18 having a lock-up clutch assembly 20. It should be appreciated that the internal passageways 14 are disposed in or between a valve body, transfer plate, steel plate and transmission case (not shown) and interconnect the above-described components.

The hydraulic circuit 10 also includes a pressure regulator valve, generally indicated at 22, connected by internal passageways 14 to the pump assembly 16 and to a solenoid or fluid switch valve (not shown) and a manual valve (not shown). The hydraulic circuit 10 further includes a lock-up (LU) control valve, generally indicated at 24, and a torque converter (T/C) control valve, generally indicated at 26, connected by internal passageways 14 to the pressure regulator 22. The hydraulic circuit 10 also includes a cooler 28 and bypass valve 30 connected by internal passageways 14 to the T/C control valve 26. It should be appreciated that valves vent to the sump as indicated by the letter "V". It should also be appreciated that the other letters in FIGS. 1 through 3 represent restrictions in the internal passageways 14.

Referring to FIGS. 4 and 5, the LU control valve 24 includes a dumbbell shaped main valve 32 and an end valve 34 disposed within a valve body 36. The main valve 32 has first and second lands 38 and 40 and the end valve 34 has a land 42. The first and second lands 38 and 40 may include grooves 44 and 46 for shedding dirt and foreign matter in the fluid that may cling to the main valve 32. The main valve 32 is disposed within an axial bore 48 of the valve body 36. The end valve 34 is disposed within a bore 50 of a housing 52 and has a spring 54 disposed about the end valve 34 between the land 42 and one end of the housing 52. The housing 52 is disposed within the axial bore 48 of the valve body 36 and restricted in movement by a first retainer 56. The main valve 32 may abut the land 42 of the end valve 34 and is restrained from movement in one axial direction by a second retainer, generally indicated at 58. The second retainer 58 is generally a plate member 60 having spaced feet 62 extending in one axial direction and a center stop 64 extending in an opposite axial direction. The center stop 64 is disposed in an internal passageway 14 and engages a projection 66 on the valve body 36. It should be appreciated that the valve body 36 includes numerous internal passageways 14.

The hydraulic circuit 10 also includes an accumulator, generally indicated at 68, to cushion or dampen the application of the LU control valve 24. As illustrated in FIG. 4, the accumulator 68 comprises a spring 70 disposed in bore 72 of a piston 74. The piston 74 is slidably disposed in the axial bore 48 of the valve body 36. The accumulator 68 acts to absorb the fluid apply pressure to help cushion the application of the LU control valve 24. It should be appreciated that the second retainer 58 is disposed between the LU control valve 24 and accumulator 68 to retain the same within their respective portions of the axial bore 48 of the valve body 36.

Referring to FIG. 1, the ball check valve 30 includes a steel ball 76 operating against a seat 78, typically formed in a caged housing in the transmission case (not shown), and is used to limit pressure drop across the cooler by opening and closing the internal passageway 14. The ball 76 is seated by a spring 80 acting against the ball 76 and unseated by pressure being applied on the opposite or seat side of the ball 76. It should be appreciated that the T/C control valve 26 and pressure regulator 22 include springs 82 and 84, respectively, at one end to preload these valves. It should also be appreciated that the T/C control valve 26 may include grooves (not shown) for shedding dirt or foreign matter.

As illustrated in FIGS. 1 through 3, the hydraulic circuit 10 is partially shown. The dense shading or hatching in the internal passageways 14 shows fluid at pump pressure. The sparse shading or hatching in the internal passageways 14 illustrates a low fluid pressure. The intermediate shading or hatching in the internal passageways 14 illustrates a fluid pressure between that of pump pressure and a low pressure. The absence of shading or hatching shows the internal passageways 14 as vented.

As illustrated in FIG. 1, when unlock is desired and the automatic transmission is in direct gear, the pressure regulator 22 allows fluid from the pump assembly 16 to flow through the pressure regulator 22 between the first and second lands 86 and 88 thereof to the T/C control valve 26. The T/C control valve 26 allows fluid from the pressure regulator 22 to flow between the second and third lands 90 and 92 of the T/C control valve 26 to the torque converter assembly 18. This fluid pressure moves a lock-up piston (not shown) off or in disengagement with a friction disc (not shown) of the lock-up clutch assembly 20 so that lock-up is not applied. Fluid also flows from the T/C control valve 26 to the LU control valve 24 between the first and second lands 38 and 40 thereof. Fluid from the first and second lands 38 and 40 flows about the end valve 34 and is dead ended by a first land 94 of the T/C control valve 26. Fluid from the manual valve is dead ended by the first land 38 of the LU control valve 24. Fluid also flows from the torque converter assembly 18 back to the T/C control valve 26 between the first and second lands 94 and 90. Fluid from the first and second lands 94 and 90 of the T/C control valve 26 flows through the cooler 28 where it is cooled and used for lubrication. It should be appreciated that fluid also flows between lands 96 and 98 of the T/C control valve 26 to regulate pressure in the torque converter assembly 18 to maintain a predetermined pressure such as less than ninety (90) PSI.

As illustrated in FIG. 2, when full lock-up of the torque converter assembly 18 is desired, fluid flows from a solenoid-actuated valve (not shown) through a solenoid switch valve (not shown) to an end of the T/C control valve 26. As a result, the T/C control valve 26 is moved and fluid flow from the pump assembly 16 flows through the pressure regulator 22 to the second and third lands 90 and 92 of the T/C control valve 26 to the cooler 28. Fluid also flows from the solenoid-actuated valve through the solenoid switch valve to the LU control valve 24. As a result, the accumulator 68 and LU control valve 24 are moved away from each other axially to allow fluid from the manual valve to flow between the first and second lands 38 and 40 of the LU control valve 24. Fluid from the first and second lands 38 and 40 flows to the end valve 34 and between the first and second lands 94 and 90 of the T/C control valve 26. Fluid from the first and second lands 94 and 90 of the T/C control valve 26 flows to the torque converter assembly 18. Since fluid flow is vented from the release side of the torque converter assembly 18 by the T/C control valve 26, the fluid flow from the first and second lands 94 and 90 of the T/C control valve 26 to the apply side of the torque converter assembly 18 causes the lock-up piston to fully engage the friction disc of the torque converter assembly 18.

As illustrated in FIG. 3, when partial lock-up of the torque converter assembly 18 is desired, a transmission controller (not shown) transmits command signals to cycle or modulate the solenoid-actuated valve to allow fluid flow from the manual valve through the solenoid switch valve to one end of the LU control valve 24 to actuate or cycle this valve by fluid pressure. The fluid pressure required for zero apply pressure (i.e., to just overcome the spring 54) is above that to hold the T/C control valve 26 in the lock-up position illustrated in FIG. 2. As a result, the T/C control valve 26 is moved and fluid flows from the pump assembly 16 through the pressure regulator 22 and between the second and third lands 90 and 92 of the T/C control valve 26 to the cooler 28. Also, movement of the T/C control valve 26 vents fluid from the release side of the torque converter assembly 18.

For the LU control valve 24, pressure on the end of land 40 is balanced by the spring 54 and the pressure on the end of the land 42. The cycling or modulating of the solenoid-actuated valve causes the land 42 to be pressurized or vented to cycle or modulate the LU control valve 24. As a result, the LU control valve 24 allows regulated pressure to flow between the first and second lands 38 and 40 to the T/C control valve 26. Fluid flows through the first and second lands 94 and 90 of the T/C control valve 26 to the apply side of the torque converter assembly 18 and causes the lock-up piston to engage the friction disc of the lock-up clutch assembly 20. The command signals from the transmission controller to the solenoid-actuated valve allow fluid pressure to actuate or cycle the LU control valve 24 to control engagement and disengagement of the lock-up piston with the friction disc, resulting in partial lock-up of the torque converter assembly 18. It should be appreciated that by the duty cycle of the solenoid-actuated valve controls the rate and amount of partial lock-up of the torque converter assembly 18.

Accordingly, the T/C control valve 26 provides single-sided control of the apply pressure to the torque converter assembly 18. Also, the T/C control valve 26 is placed between the LU control valve 24 and the torque converter assembly 18 to reduce the probability of debris from the torque converter assembly 18 causing the LU control valve 24 to stick with debris coming from the torque converter assembly 18 during unlock operation. Further, the accumulator 68 provides dampening to improve lock-up apply control by reducing the oscillation of the LU control valve 24.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. In a vehicle transmission having a torque converter assembly for transmitting torque from an output member of a vehicle engine to an input member of the vehicle transmission and having a fluid actuated lock-up device for frictionally engaging the torque converter assembly to the output member of the vehicle engine during an engagement operating mode and disengaging the torque converter assembly during a disengagement operating mode, a valve assembly in a fluid system of the vehicle transmission for directing fluid flow from a fluid source to the torque converter assembly, said valve assembly comprising:

a regulator valve means for establishing a pressure level of fluid flow from a fluid source;

a first fluid path communicating with said regulator valve means and a release side of the torque converter assembly;

a second fluid path communicating with an apply side of the torque converter assembly;

a torque converter control valve disposed in said first and second fluid paths for controlling fluid pressure in said first fluid path to the torque converter assembly during the disengagement operating mode and venting said first fluid path during the engagement operating mode; and a lock-up control valve receiving fluid pressure feedback from said torque converter control valve to close a third fluid path during the disengagement operating mode and opening the third fluid path for allowing fluid pressure to the apply side of the torque converter assembly during the engagement operating mode.

2. A valve assembly as set forth in claim 1 including means for enclosing said regulator valve means and said torque converter control valve and allowing reciprocal movement therein.

3. A valve as set forth in claim 2 wherein said enclosing means includes a plurality of passageways interconnecting the fluid source and said regulator valve means and said torque converter control valve and the torque converter assembly for fluid flow therein.

4. A valve assembly as set forth in claim 2 including a biasing means disposed between one end of said lock-up control valve and said enclosing means for preloading said lock-up control valve.

5. A valve assembly as set forth in claim 4 wherein said biasing means comprises a spring.

6. A valve assembly as set forth in claim 1 including means for cushioning the application of said lock-up control valve.

7. In a vehicle transmission having a torque converter assembly for transmitting torque from an output member of a vehicle engine to an input member of the vehicle transmission and having a fluid actuated lock-up device for frictionally engaging the torque converter assembly to the output member of the vehicle engine during an engagement operating mode and disengaging the torque converter assembly during a disengagement operating mode, a valve assembly in a fluid system of the vehicle transmission for directing fluid flow from a fluid source to the torque converter assembly, said valve assembly comprising:

a regulator valve means for establishing a pressure level of fluid flow from a fluid source;

a torque converter control valve for controlling inlet and outlet fluid pressure to and from the torque converter assembly;

means for enclosing said regulator valve means and said torque converter control valve and allowing reciprocal movement therein;

said enclosing means including a plurality of passageways interconnecting the fluid source and said regulator valve means and said torque converter control valve and the torque converter assembly for fluid flow therein;

said torque converter control valve including a plurality of lands for opening a first passageway interconnecting said regulator valve means and the torque converter assembly during the disengagement operating mode and venting the first passageway during the engagement operating mode;

a lock-up control valve having a plurality of lands for closing a second passageway to the torque converter assembly during the disengagement operating mode and opening the second passageway during the engagement operating mode;

means for cushioning the application of said lock-up control valve; and said cushioning means comprising an accumulator disposed in said enclosing means at one end of said lock-up control valve.

8. n a vehicle transmission having a torque converter assembly for transmitting torque from an output member of a vehicle engine to an input member of the vehicle transmission and having a fluid actuated lock-up device for frictionally engaging the torque converter assembly to the output member of the vehicle engine during an engagement operating mode and disengaging the torque converter assembly during a disengagement operating mode, a valve assembly in a fluid system of the vehicle transmission for directing fluid flow from a fluid source to the torque converter assembly, said valve assembly comprising:

a regulator valve means for establishing a pressure level of fluid flow from a fluid source;

a torque converter control valve for controlling inlet and outlet fluid pressure to and from the torque converter assembly;

means for enclosing said regulator valve means and said torque converter control valve and allowing reciprocal movement therein;

said enclosing means including a plurality of passageways interconnecting the fluid source and said regulator valve means and said torque converter control valve and the torque converter assembly for fluid flow therein;

said torque converter control valve including a plurality of lands for opening a first passageway interconnecting said regulator valve means and the torque converter assembly during the disengagement operating mode and venting the first passageway during the engagement operating mode;

a lock-up control valve having a plurality of lands for closing a second passageway to the torque converter assembly during the disengagement operating mode and opening the second passageway during the engagement operating mode;

means for cushioning the application of said lock-up control valve;

said cushioning means comprising an accumulator disposed in said enclosing means at one end of said lock-up control valve; and means for limiting axial movement of said lock-up control valve and said accumulator.

9. A valve assembly as set forth in claim 8 wherein said limiting means comprises a retainer disposed between said lock-up control valve and said accumulator.

10. In a vehicle transmission having a torque converter assembly for transmitting torque from an output member of a vehicle engine to an input member of the vehicle. transmission and having a fluid actuated lock-up device for frictionally engaging the torque converter assembly to the output member of the vehicle engine during an engagement operating mode and disengaging the torque converter assembly during a disengagement operating mode, a valve assembly in a fluid system of the vehicle transmission for directing fluid flow from a fluid source to the torque converter assembly, said assembly comprising:

a regulator valve for establishing a pressure level of fluid flow from a fluid source;

means forming a plurality of passageways interconnecting the fluid source and said regulator valve and the torque converter assembly for fluid flow therein;

a torque converter control valve for allowing fluid pressure to a release side of the torque converter assembly from said regulator valve during the disengagement operating mode and for venting fluid pressure from the release side of the torque converter assembly during the engagement operating mode; and a lock-up control valve for allowing fluid pressure to an apply side of the torque converter assembly during the engagement operating mode.

11. In a vehicle transmission having a torque converter assembly for transmitting torque from an output member of a vehicle engine to an input member of the vehicle transmission and having a fluid actuated lock-up device for frictionally engaging the torque converter assembly to the output member of the vehicle engine during an engagement operating mode and disengaging the torque converter assembly during a disengagement operating mode, a valve assembly in a fluid system of the vehicle transmission for directing fluid flow from a fluid source to the torque converter assembly, said assembly comprising:

a regulator valve for establishing a pressure level of fluid flow from a fluid source;

means forming a plurality of passageways interconnecting the fluid source and said regulator valve and the torque converter assembly for fluid flow therein;

a torque converter control valve for allowing fluid pressure to a release side of the torque converter assembly from said regulator valve during the disengagement operating mode and for venting fluid pressure from the release side of the torque converter assembly during the engagement operating mode;

a lock-up control valve for allowing fluid pressure to an apply side of the torque converter assembly during the engagement operating mode; and an accumulator for cushioning the application of said lock-up control valve.

12. A valve assembly as set forth in claim 11 including a retainer disposed between said lock control valve and said accumulator for limiting axial movement of said lock-up control valve and said accumulator.

13. In a vehicle transmission having a torque converter assembly for transmitting torque from an output member of a vehicle engine to an input member of the vehicle transmission and having a fluid actuated lock-up device for frictionally engaging the torque converter assembly to the output member of the vehicle engine during an engagement operating mode and disengaging the torque converter assembly during a disengagement operating mode, a valve assembly in a fluid system of a vehicle transmission for directing fluid flow from a fluid source to the torque converter assembly, said assembly comprising:
- a regulator valve for establishing a pressure level of fluid flow from a fluid source;
- means forming a plurality of passageways interconnecting the fluid source and said regulator valve and the torque converter assembly for fluid flow therein;
- a torque converter control valve for allowing fluid pressure to the torque converter assembly from said regulator valve during the disengagement operating mode and for venting fluid pressure from the torque converter assembly during the engagement operating mode;
- a lock-up control valve for allowing inlet fluid pressure to the torque converter assembly during the engagement operating mode;
- an accumulator disposed at one end of said lock-up control valve for cushioning the application of said lock-up control valve; and
- a retainer disposed between said lock-up control valve and said accumulator for limiting axial movement of said lock-up control valve and said accumulator.

* * * * *